US010295654B2

(12) United States Patent
Yukumatsu et al.

(10) Patent No.: US 10,295,654 B2
(45) Date of Patent: May 21, 2019

(54) APPARATUS FOR DETERMINING DISPLACEMENT OF RADAR APPARATUS (71) Applicant: DENSO CORPORATION, Kariya, Aichi-pref. (JP)

(72) Inventors: Masanobu Yukumatsu, Kariya (JP); Kenji Goto, Kariya (JP); Takamasa Ando, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 337 days.

(21) Appl. No.: 15/031,483

(22) PCT Filed: Oct. 22, 2014

(86) PCT No.: PCT/JP2014/078073
§ 371 (c)(1),
(2) Date: Apr. 22, 2016

(87) PCT Pub. No.: WO2015/060338
PCT Pub. Date: Apr. 30, 2015

(65) Prior Publication Data
US 2016/0266241 A1 Sep. 15, 2016

(30) Foreign Application Priority Data
Oct. 23, 2013 (JP) .................................. 2013-220227

(51) Int. Cl.
*G01S 13/93* (2006.01)
*G01S 7/40* (2006.01)
*G01S 7/02* (2006.01)

(52) U.S. Cl.
CPC .............. *G01S 7/4026* (2013.01); *G01S 7/40* (2013.01); *G01S 13/931* (2013.01);
(Continued)

(58) Field of Classification Search
CPC ............ G01S 13/931; G01S 2007/027; G01S 2013/9364; G01S 2013/9367; G01S 2013/9389; G01S 7/40; G01S 7/4026
(Continued)

(56) References Cited

FOREIGN PATENT DOCUMENTS

JP 2004-085258 A 3/2004
JP 2006-047140 A 2/2006
(Continued)

OTHER PUBLICATIONS

International Search Report (translated version); International Application No. PCT/JP2014/078073, filed Oct. 22, 2014; 8 pages.

*Primary Examiner* — Timothy A Brainard
(74) *Attorney, Agent, or Firm* — Knobbe, Martens, Olson & Bear, LLP (57) ABSTRACT A determination unit that determines a positional change of a radar apparatus mounted on a vehicle including a vehicle body is provided with a reference member, a displacement sensor and displacement determining means. The reference member is fixed to the vehicle body and disposed such that at least a part of the reference member is adjacent to the radar apparatus. The displacement sensor detects a displacement of the radar apparatus with respect to the reference member. The determining means determines whether or not a position of the radar apparatus has changed with respect to the vehicle body, based on the displacement detected by the displacement sensor.

8 Claims, 4 Drawing Sheets (52) U.S. Cl.
CPC . *G01S 2007/027* (2013.01); *G01S 2013/9364* (2013.01); *G01S 2013/9367* (2013.01); *G01S 2013/9389* (2013.01)

(58) Field of Classification Search
USPC .......................................................... 342/70
See application file for complete search history.

(56) References Cited

FOREIGN PATENT DOCUMENTS

| | | | |
|---|---|---|---|
| JP | 2006047140 A | * | 2/2006 |
| JP | 2010-096588 A | | 4/2010 |
| JP | 2010-122045 A | | 6/2010 |
| JP | 2010-243219 A | | 10/2010 |
| WO | 2015/060338 A1 | | 4/2015 |

* cited by examiner

APPARATUS FOR DETERMINING DISPLACEMENT OF RADAR APPARATUS

CROSS-REFERENCE TO RELATED APPLICATION

This application is based on and claims the benefit of priority from earlier Japanese Patent Application No. 2013-220227 filed Oct. 23, 2013, the description of which is incorporated herein by reference.

BACKGROUND OF THE INVENTION

Technical Field

The present disclosure relates to a radar apparatus, and more particularly to a technique which determines a displacement (i.e., positional displacement) of a radar apparatus mounted on a vehicle.

Background

Conventionally, a radar apparatus has been used to perform various controls in order to improve running safety of a vehicle, in which radar waves including laser light, ultrasonic waves and millimeter waves are transmitted/received so as to detect objects existing around the vehicle.

The radar apparatus is mounted on a predetermined position of a vehicle so as to irradiate radar waves within a predetermined irradiation range. Hence, due to various reasons, when the mounting position of the radar apparatus is shifted, the radar waves cannot be irradiated within the predetermined irradiation range so the detection accuracy of an object is decreased. As a result, there has been a problem that the accuracy is decreased in the various controls for improving the running safety of the vehicle.

According to JP-A-2004-85258, a technique for detecting a positional displacement of the radar apparatus has been proposed (PTL 1). Further, JP-A-2004-85258 discloses a configuration in which a deviation of the axis in the radar apparatus is detected for a direction perpendicular to the running surface of the vehicle, by using a detection value of the acceleration sensor provided on the vehicle body and a detection value of the acceleration sensor provided in the radar apparatus.

CITATION LIST

Patent Literature

[PTL 1]JP-A-2004-85258

In the above-described technique, to determine whether or not a positional displacement of the radar apparatus has occurred, it is necessary to compare the detection value of the acceleration sensor provided on the vehicle body and the detection value of the acceleration sensor provided in the radar apparatus, which causes a problem that the configuration becomes more complex.

SUMMARY

The present disclosure provides a technique that determines a displacement (positional displacement) of a radar apparatus mounted on a vehicle with a simple configuration.

As a typical example of a determining unit, a determination unit that determines a positional change of a radar apparatus mounted on a vehicle with respect to a vehicle body is provided with a reference member, a displacement sensor and displacement determining means. The reference member is fixed to the vehicle body and disposed such that at least a part of the reference member is adjacent to the radar apparatus. The displacement sensor detects a displacement of the radar apparatus with respect to the reference member. The determining means determines whether or not a position of the radar apparatus has changed with respect to the vehicle body, based on the displacement detected by the displacement sensor.

According to this configuration, a positional change of the radar apparatus with respect to the vehicle body is detected as a displacement of the radar apparatus with respect to the reference member where at least a part of the reference member is adjacent to the radar apparatus. Accordingly, the displacement of the radar apparatus can be directly determined using the displacement sensor. Therefore, compared to the conventional art, a positional displacement of the radar apparatus can be determined with a simple configuration.

As a typical example of a determining unit, a determination unit that determines a positional change of a radar apparatus mounted on a vehicle with respect to a vehicle body is provided with a connecting member, a strain sensor and strain determination means. The connecting member connects the vehicle body and the radar apparatus. The strain sensor detects a strain of the connecting member itself. The strain determination means determines whether or not a position of the radar apparatus is changed with respect to the vehicle body, based on the strain detected by the strain sensor.

According to this configuration, a positional change of the radar apparatus is detected with respect to the vehicle body as a strain of the connecting member. Hence, the displacement of the radar apparatus can be directly determined. Therefore, compared to the conventional art, the determining unit of the present disclosure can determine the positional displacement of the radar apparatus with a simple configuration.

It should be noted that the reference signs in the parenthesis described in this section and claims represent the correspondence with the specific means described in the embodiments as one aspect which are described later, and the reference signs are not used to limit the technical scope of the present disclosure.

DETAILED DESCRIPTION OF THE PREFERRED EMBODIMENTS

With reference to the drawings, hereinafter, embodiments of the present disclosure will be described.

(First Embodiment)

[Configuration]

Figure 1:
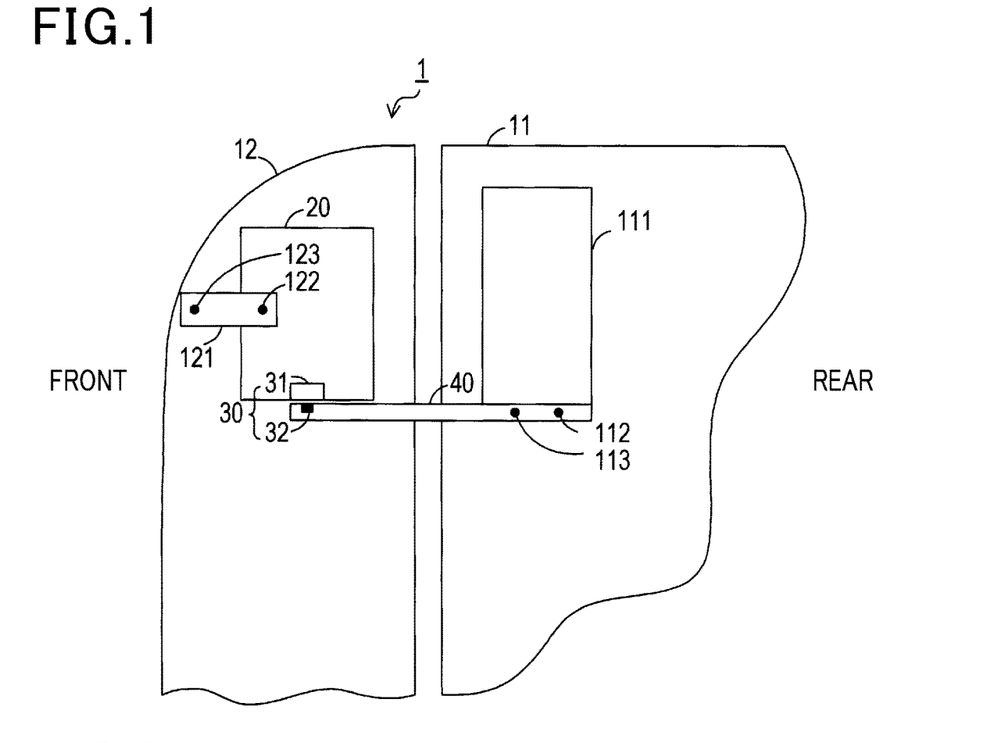
FIG. 1 is a diagram that illustrates a relationship between a radar apparatus and a vehicle body according to the first embodiment.

As shown in FIG. 1, a radar apparatus 20 is mounted on a vehicle 1. The radar apparatus 20 detects an object which exists in front of (left side in FIG. 1) the vehicle 1 by transmitting/receiving radar waves. The radar apparatus 20 is fixed to a bumper 12 as an exterior part which is fixed in front of the vehicle body 11, by using an attaching member 121 together with attaching screws 122 and 123. In other words, the radar apparatus 20 is fixed to the vehicle body 11 via the bumper 12.

Also, a bar-shaped stay 40 is provided on the vehicle 1, protruding towards the bumper 12 from the vehicle body 11 such that the tip portion is adjacently located to the radar apparatus 20. The stay 40 is made of a material having high rigidity (e.g., metal or ceramics) and directly fixed to the vehicle body 11 (without bumper 12). Specifically, the stay 40 is fixed to an attaching portion 111 provided in a front part of the vehicle body 11 with attaching screws 112 and 113. In other words, one end (fixed end) of the stay 40 is fixed to the vehicle body 11 and the other end (free end) is disposed to be adjacent to the radar apparatus 20. The stay 40 is disposed such that one surface in the tip portion of the free end (upper surface in this example) faces one surface (lower surface in this example) in the housing of the radar apparatus 20.

A Hall element 31 and a magnet 32 are provided on surfaces each facing a surface of the radar apparatus or the Hall element. In the example, the Hall element 31 is disposed on the radar apparatus 20 and the magnet 32 is disposed on the stay 40. However respective elements may be disposed conversely. The magnet 32 is arranged such that one magnetic pole faces the vehicle body 11 (rear side) and the other magnetic pole faces the bumper 12 (front side).

Figure 2:
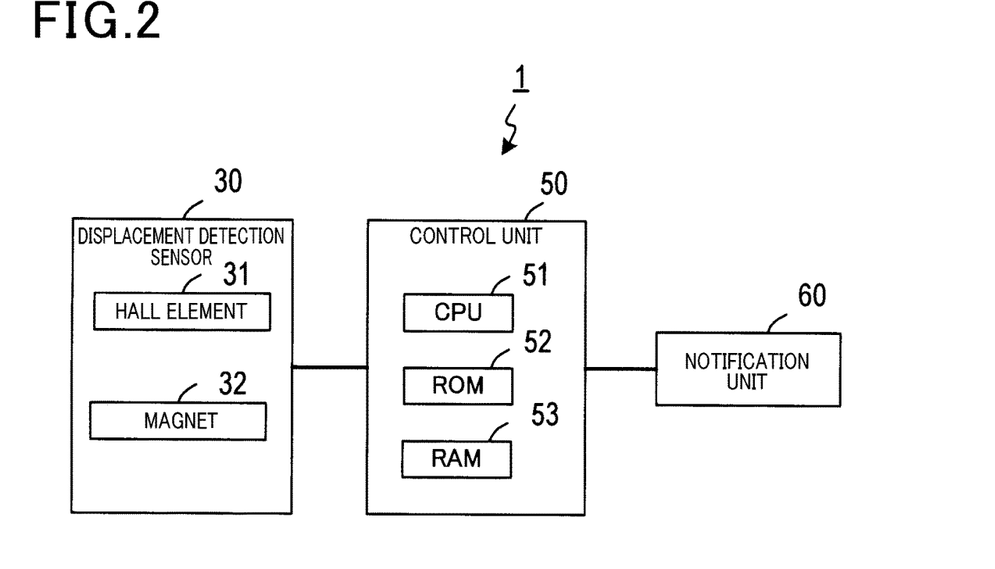
FIG. 2 is a block diagram showing an electrical configuration which relates to a Hall element.

Next, electrical configurations related to the Hall element 31 will be described. As shown in FIG. 2, the vehicle 1 is provided with a displacement detection sensor 30 including the above-described Hall element 31 and the magnet 32, a control unit 50 and a notification device 60. According to the present embodiment, the control unit 50 and the notification device 60 are disposed in the vehicle body 11.

As for the displacement detection sensor 30, the Hall element 31 detects a magnetic field (magnetic flux density) produced by the magnet 32 and the displacement detection sensor 30 outputs a signal proportional to the detected magnitude of the magnetic field (e.g., signal showing a voltage value) to the control unit 50. Thus, the displacement detection sensor 30 detects a displacement of the radar apparatus 20, i.e., a positional change of the radar apparatus 20 with respect to the stay 40 (specifically, a portion adjacent to the radar apparatus 20 in the stay 40).

Figure 3:
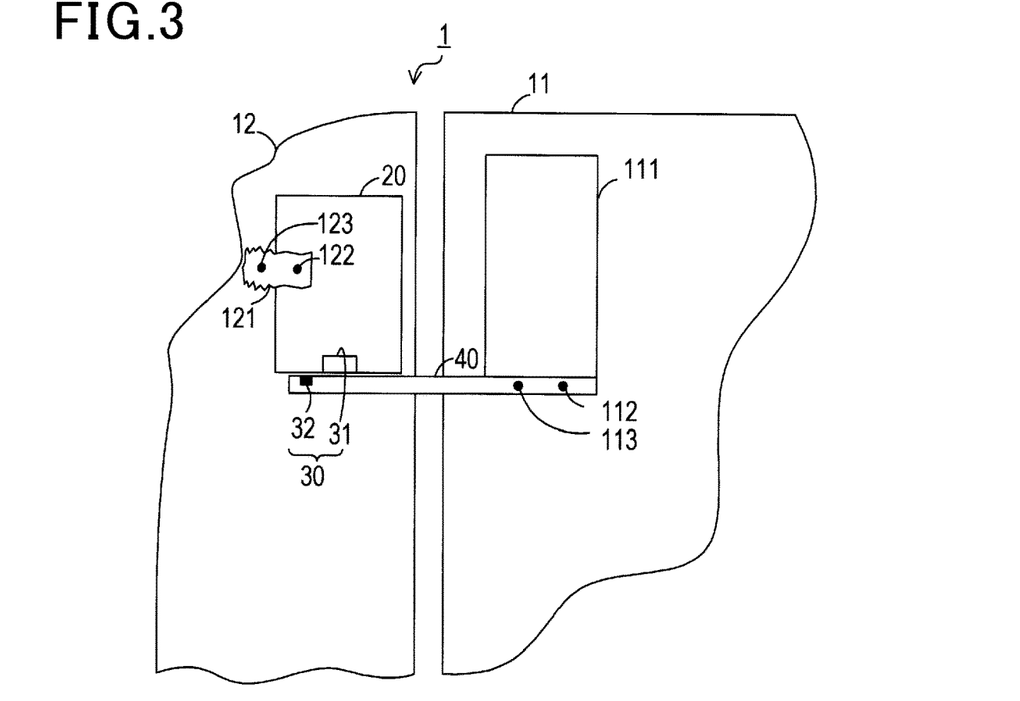
FIG. 3 is a diagram showing a second state where the radar apparatus is displaced.

Specifically, for example, as shown in FIG. 1, in an initial state where the radar apparatus 20 is mounted on the bumper 12 (e.g., state when the vehicle 1 is shipped), an output signal (output value) of the displacement detection sensor 30 shows a constant value (reference output value). In contrast, for example, as shown in FIG. 3, when the position of the radar apparatus 20 is changed with respect to the vehicle body 11 because of some reason (for example, dent or displacement of the bumper 12 due to a collision), the position of the magnet 32 varies with respect to the Hall element 31. Accordingly, a magnitude of the magnetic field detected by the Hall element 31 varies so that the output value of the displacement detection sensor 30 varies from the reference output value. In other words, the displacement of the radar apparatus 20 with respect to the stay 40 is detected by the displacement detection sensor 30. The output value of the displacement detection sensor 30 becomes a value corresponding to the displacement of the radar apparatus 20 with respect to the vehicle body 11.

As shown in FIG. 2, the control unit 50 is constituted of a known microcomputer mainly including a CPU 51, a ROM 52 and a RAM 53. The control unit 50 (CPU 51) executes, in accordance with a program stored in the ROM 52, a displacement determination process which will be described later.

The notification unit 60 is provided on an instrument panel in the vehicle cabin to perform a notification on the display. Specifically, based on a control signal from the control unit 50, the notification unit 60 notifies the user (driver and passenger) the position of the radar apparatus 20 has changed with respect to the vehicle body 11, that is, a positional displacement has occurred on the radar apparatus 20.

[Processing]

Figure 4:
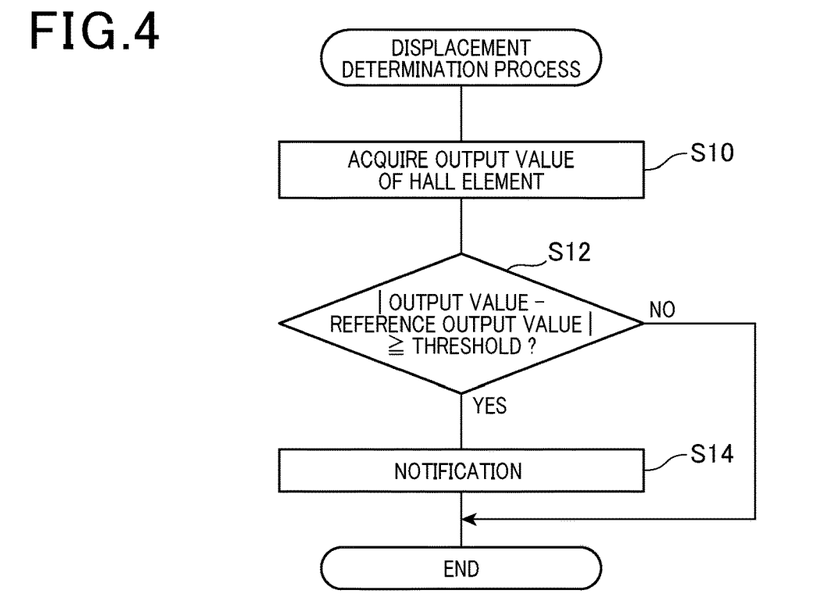
FIG. 4 is a flowchart showing a displacement determination process according to the first embodiment.

Next, the displacement determination process executed by the CPU 51 will be described with reference to a flowchart shown in FIG. 4. It should be noted that the process shown in FIG. 4 is repeatedly executed at a predetermined cycle while the ignition is turned ON.

First, in a process at step S10 (S represents steps), an output value of the displacement detection sensor 30 is acquired. Next at S12, the process determines whether or not an absolute value of a difference between the output value acquired at S10 and the reference output value (hereinafter, referred to as a displacement value) is equal to or more than a predetermined threshold. When the process determines that the displacement value is not equal to or more than the threshold value (i.e., is less than the threshold), the displacement determination process is terminated. Meanwhile, the displacement value is equal to or more than the threshold, the process proceeds to S14. The process at S14 outputs a control signal to the notification unit 60 so as to notify the user a positional displacement has occurred on the radar apparatus 20. Then, the displacement determination process is terminated.

[Effects]

According to the first embodiment as described in detail, the following effects can be obtained. A change in the position of the radar apparatus 20 with respect to the vehicle body 11 is detected as a displacement of the radar apparatus 20 with respect to the stay 40 of which the tip portion is adjacently located to the radar apparatus 20. Accordingly, by using the displacement detection sensor 30, the displacement of the radar apparatus 20 can be directly determined. As a result, according to the first embodiment, compared with a conventional art, a positional displacement of the radar apparatus 20 can be determined with a simple configuration.

Also, according to a conventional art in which a positional displacement of the radar apparatus 20 is determined by comparing the detection values between acceleration sensors disposed in the vehicle body and the radar apparatus, detection errors in two acceleration sensors influence the determination accuracy. However, according to the first embodiment, since single displacement detection sensor 30 is used to determine the positional displacement, an influence of the detection error is suppressed, thereby improving the determination accuracy. As a result, since high accurate sensor is not necessary, cost reduction can be achieved.

Further, the radar apparatus 20 is fixed to the vehicle body 11 via the bumper 12 which is an exterior part, and the stay 40 is fixed to the vehicle body 11 and not to the bumper 12. The stay 40 is constituted as a component protruding from the vehicle body 11 to the bumper 12. Thus, according to the first embodiment, even when the radar apparatus 20 is displaced with respect to the vehicle body 11 because of a dent or a displacement of the bumper due to a collision or the like, the position of the stay 40 is unlikely to change with respect to the vehicle body 11. Therefore, the displacement of the radar apparatus 20 with respect to the stay 40 can be detected accurately as a displacement of the radar apparatus with respect to the vehicle body 11.

Furthermore, in the displacement determination process executed by the control unit 50, when the displacement detected by the displacement detection sensor 30 is equal to or more than a predetermined threshold, the process determines that positional displacement of the radar apparatus 20 has occurred. Therefore, according to the first embodiment, erroneous detection of a positional displacement of the radar apparatus 20 due to a slight positional change or a detection error can be avoided.

The notification process executed by the control unit 50 performs a notification process to notify the passenger of the vehicle when the process determines that the position of the radar apparatus 20 with respect to the vehicle body 11 has changed. Therefore, according to the first embodiment, the passenger in the vehicle can recognize an occurrence of the positional displacement of the radar apparatus 20.

According to the first embodiment, the control unit 50 corresponds to one example of displacement determining means and the stay 40 corresponds to one example of a reference member, the displacement detection sensor 30 corresponds to one example of a displacement sensor and the bumper 12 corresponds to one example of the exterior part. Moreover, step S12 corresponds to one example of a process of the determining means and the step S14 corresponds to one example of a process of the notification means. The above-described control unit 50, the stay 40, the displacement detection sensor 30 and step S12 constitute a determination unit.

(Second Embodiment)
[Configuration]
As for the second embodiment, basic configuration is the same as that of the first embodiment. Hence, explanations for the same configuration are omitted and mutually different configurations will be mainly described.

In the above-described vehicle 1 of the first embodiment, the radar apparatus 1 is fixed to the vehicle body 11 via the bumper 12. However, in the vehicle 2 according to the second embodiment shown in FIG. 5, the radar apparatus 20 is fixed to the vehicle body 11 by the connecting stays 71 and 72.

Figure 5:
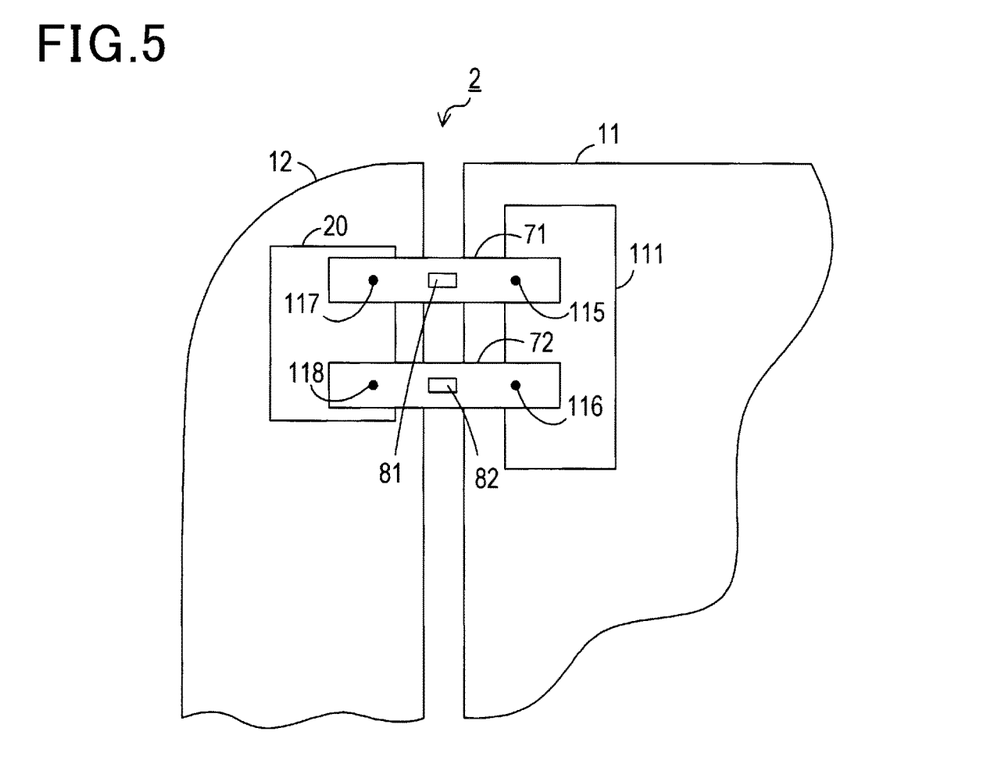
FIG. 5 is a diagram showing a relationship between a radar apparatus and a vehicle body according to the second embodiment.

In more detail, in the vehicle 2, bar-shaped two connecting stays 71 and 72 are provided, protruding from the vehicle body 11 to the radar apparatus 20. The connecting stays 71 and 72 are formed using a material (e.g., metal) having high rigidity and elastic-deformed properties by an external force, and provided so as to connect between the vehicle body 11 and the radar apparatus 20. Specifically, one end portions of the connecting stays 71 and 72 are fixed to the attaching portion 111 provided in the front part of the vehicle body 11 with attaching screws 115 and 116, and the other end portions are fixed to the radar apparatus 20 with attaching screws 117 and 118. The connecting stays 71 and 72 are arranged such that one surface (side surface in this example) in the housing of the radar apparatus 20 is connected to one surface of the same side surface (side surface) of the attaching portion 111.

Figure 6:
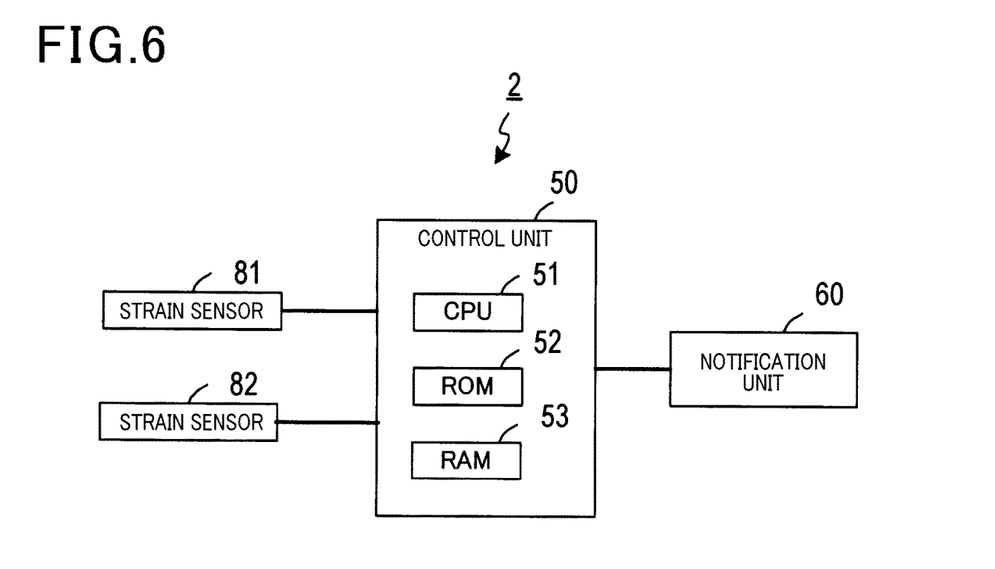
FIG. 6 is a block diagram showing an electrical configuration which relates to a strain sensor.

Moreover, according to the second embodiment, two strain sensors 81 and 82 are provided on a middle portion in the longitudinal direction of the connecting stays 71 and 72 so as to detect a strain of the connecting stays 71 and 72. An electrical configuration related to the strain sensors 81 and 82 is described hereinafter. As shown in FIG. 6, the vehicle 2 is provided with the above-described strain sensors 81 and 82, and the control unit 50 and the notification unit 60 which are similar to those of the first embodiment.

According to the present embodiment, the strain sensors 81 and 82 detect a strain (deformation) produced at the connecting stays 71 and 72 using a strain gage, and output a signal proportional to a magnitude of the detected strain (e.g., signal indicating a voltage value) to the control unit 50.

In other words, as shown in FIG. 5 for example, in an initial state where the radar apparatus 20 is mounted on the vehicle body 11 using the connecting stays 71 and 72 (e.g., state when the vehicle 2 is shipped), the output signals (output values) of the strain sensors 81 and 82 show a constant value (reference output value). In contrast, due to some reasons (for example, dent or displacement of the bumper 12 due to a collision), when the position of the radar apparatus 20 is changed with respect to the vehicle body 11, the connecting stays 71 and 72 are deformed. Therefore, a magnitude of the strain detected by the strain sensors 81 and 82 is changed so that the output values of the strain sensors 81 and 82 are changed as well. In other words, according to the second embodiment, a displacement of the radar apparatus 20 with respect to the vehicle body 11 is detected by the strain sensors 81 and 82.

The control unit 50 (CPU 51) shown in FIG. 6 executes a program stored in the ROM 52 to perform a strain determination process which will be described as follows, instead of the displacement determination process (refer to FIG. 4) of the first embodiment.

Figure 7:
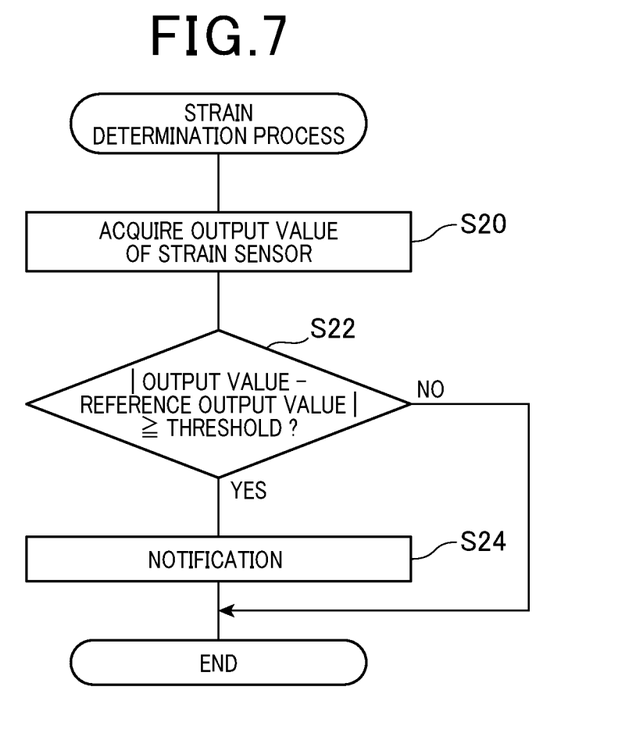
FIG. 7 is a flowchart showing a strain determination process according to the second embodiment.

[Process]
Next, the strain determination process executed by the CPU 51 will be described with reference to the flowchart shown in FIG. 7. The strain determination process is repeatedly executed at a predetermined cycle while the ignition is turned ON, similar to the displacement determination process of the first embodiment.

In the process of S20, the output values of the strain sensors 81 and 82 are acquired. Next, a process at step S22 determines whether or not an absolute value of a difference (hereinafter referred to as displacement value) between the output values acquired at S20 and the reference output value is equal to or more than a predetermined threshold. Here, when both displacement values among displacement values detected by the two strain sensors 81 and 82 are not more than or equal to the threshold (i.e., less than the threshold), the strain determination process is terminated. Meanwhile, if at least one displacement value in the displacement values of the two strain sensors 81 and 82 is equal to or more than the threshold, the process proceeds to step S24. The process at S24 outputs a control signal to the notification unit 60 so as to notify the user of that a positional displacement has occurred on the radar apparatus 20. Then, the strain determining process is terminated.

[Effects]
As described in detail, according to the second embodiment, a change in the position of the radar apparatus 20 with respect to the vehicle body 11 is detected as a strain of the connecting stays 71 and 72. Hence, a displacement of the radar apparatus 20 can be directly determined. As a result, according to the second embodiment, compared to the conventional art, the positional displacement of the is radar apparatus 20 can be determined with a simple configuration. That is, according to the second embodiment, similar effects of the first embodiment described above can be obtained.

According to the second embodiment, the control unit 50 corresponds to an example of strain determination means and the connecting stays 71 and 72 correspond to an example of a connecting member. The step S22 corresponds to one example of a process in the strain determination means and step S24 corresponds to one example of a process in the notification means. Further, according to the second embodiment, the above-described control unit 50, the connecting stays 71 and 72, the strain sensors 81 and 82 and step S22 constitute the determination unit.

[Other Embodiment]

As described, embodiments of the present disclosure are explained. However, the present disclosure is not limited to the above-described embodiments, and needless to say, various modifications can be employed.

[A] In the above-described embodiments, the control unit 50 is provided in the vehicle body 11. However, the control unit may be provided in the radar apparatus 20. A control unit of the radar apparatus 20 may perform the displacement determination process and the strain determining process.

[B] According to the above-described embodiments, as the displacement detection sensor 30 that detects a displacement produced between the stay 40 fixed to the vehicle body 11 and the radar apparatus 20, the magnet 32 and the Hall element 31 are used. However, other configurations may be used for the displacement detection sensor 30. For example, one contact of an electrical contact such as a switch is disposed in the stay 40 and the other contact of the electrical contact is disposed in the radar apparatus 20 so as to constitute the displacement detection sensor 30. Also, an optical sensor and a laser or the like may be used to constitute the displacement detection sensor 30.

[C] According to the above-described embodiments, a display unit provided on the instrument panel is exemplified as the notification unit 60. However, other configurations may be used for the notification unit 60. For example, the notification unit 60 may be composed of a speaker which outputs a sound giving a notification of a positional displacement of the radar apparatus 20 and an imaging device which outputs an image giving a notification thereof.

[D] According to the above-described embodiments, the radar apparatus 20 is fixed to the vehicle body 11 via the front bumper 12 as an exterior part. However, it is not limited to this configuration for an aspect where the radar apparatus 20 is fixed to the vehicle body 11. For example, the radar apparatus 20 may be fixed to the vehicle body 11 via a rear bumper as an exterior part, or may be fixed to the vehicle body 11 via a vehicle's door. Also, the radar apparatus 20 may be fixed to the vehicle body 11 via a sideview mirror, or may be fixed to the vehicle body 11 other than at an exterior part.

[E] According to the above-described embodiments, the stay 40 is formed in a bar shape. However, it is not limited to this configuration. The stay 40 may be formed such that at least part of stay 40 is adjacent to the radar apparatus 20. According to the above-described embodiments (FIG. 1), the stay 40 is formed to include a surface facing a surface at lower side of the housing of the radar apparatus 20. It is not limited to this configuration. The stay 40 may be formed to include a surface facing other surface of the housing of the radar apparatus 20. Moreover, according to the above-described embodiments, only one stay 40 having a displacement detection sensor 30 is provided. However, it is not limited to this configuration. For example, a plurality of stays 40 having displacement detection sensors are provided to face a plurality of surfaces of the housing of the radar apparatus 20, whereby the detection accuracy of a displacement of the radar apparatus 20 with respect to the vehicle body 11 can be improved.

[F] According to the above-described embodiments, the connecting stays 71 and 72 are formed in a bar shape. However, it is not limited to this configuration. The connecting stays 71 and 72 may be formed of a component extending to the radar apparatus 20 from the vehicle body 11. For example, a thin plate-like shape or a columnar shape may be used. Furthermore, the above-described embodiments are configured to have two connecting stays provided with strain sensors. However, it is not limited to this configuration. A configuration having a connecting stay provided with a strain sensor may used or plurality of connecting stays provided with strain sensors may be used. For example, connecting stays having strain sensors may be provided on a plurality of surfaces of the housing of the radar apparatus 20, thereby improving the detection accuracy of the displacement of the radar apparatus with respect to the vehicle body 11.

[G] A function included in a single element of the above-described embodiments may be dispersed to a plurality of elements, or functions included in a plurality of elements may be integrated to one element. Moreover, at least a part of configuration of the above-described embodiments may be substituted by a publicly known configuration having a similar function. A part of the configuration of the above-described embodiments may be omitted as long as the problem is solved. At least a part of the configuration of the above-described embodiments may be added to a configuration in other above-described embodiments or may substitute a configuration in other above-described embodiments. It should be noted that all aspects included in the technical idea specified by the wording of the claims are embodiments of the present disclosure.

[H] The present disclosure can be achieved by various modes, other than the above-described determination unit, such as a system including the determination unit as an element, a program having a computer serve as the determination unit, a recording medium where the program is recorded and a determining method.

REFERENCE SIGNS LIST 1, 2: vehicle
11: vehicle body
20: radar apparatus
30: displacement detection sensor
31: Hall element
32: magnet
40: stay
71, 72: connecting stay
81, 82: strain sensor

The invention claimed is:

1. A determination unit that determines a positional change of a radar apparatus mounted on a vehicle including a vehicle body, the determination unit comprising:

a reference member fixed to the vehicle body and disposed such that at least a part of the reference member is adjacent to the radar apparatus;

a displacement sensor that detects a displacement of the radar apparatus with respect to the reference member; and displacement determining means for determining whether or not a position of the radar apparatus has changed with respect to the vehicle body, based on the displacement detected by the displacement sensor, wherein the radar apparatus is fixed to the vehicle body via a predetermined exterior part, and the reference member is fixed to the vehicle body other than at the exterior part, and the reference member protrudes to the exterior part from the vehicle body.

2. The determination unit according to claim 1, wherein the exterior part is a bumper.

3. The determination unit according to claim 1, wherein the displacement determining means is configured to determine that the position of the radar apparatus has changed with respect to the vehicle body, when the displacement detected by the displacement sensor is a predetermined threshold or more.

4. The determination unit according to claim 1, wherein the determination unit further comprises notification means for performing a process to notify a passenger of the vehicle, when it is determined that the position of the radar apparatus has changed with respect to the vehicle body.

5. A determination unit that determines a positional change of a radar apparatus mounted on a vehicle including a vehicle body, the determination unit comprising:
   a connecting member that connects the vehicle body and the radar apparatus;
   a strain sensor that detects a strain of the connecting member itself; and
   strain determination means for determining whether or not a position of the radar apparatus is changed with respect to the vehicle body, based on the strain detected by the strain sensor.

6. The determination unit according to claim 5, wherein the connecting member extends to the radar apparatus from the vehicle body.

7. The determination unit according to claim 5, wherein the strain determination means is configured to determine that the position of the radar apparatus has changed with respect to the vehicle body, when the strain detected by the strain sensor is a predetermined threshold or more.

8. A determination method for determining a positional change of a radar apparatus mounted on a vehicle including a vehicle body, the determination method comprising:
   preparing a reference member and a displacement sensor that detects a displacement of the radar apparatus with respect to the reference member;
   arranging the reference member to be fixed to the vehicle body such that at least a part of the reference member is adjacent to the radar apparatus;
   detecting a displacement of the displacement sensor; and
   determining whether or not a position of the radar apparatus has changed with respect to the vehicle body, wherein
   the radar apparatus is fixed to the vehicle body via a predetermined exterior part, and the reference member is fixed to the vehicle body other than at the exterior part, and
   the reference member protrudes to the exterior part from the vehicle body.

* * * * *